United States Patent Office 2,924,601
Patented Feb. 9, 1960

2,924,601

BETA-(2-PYRIDYL) ETHYLTRICHLOROSILANE AND PROCESS

John F. Brown, Jr., Schenectady, N.Y., assignor to General Electric Company, a corporation of New York No Drawing. Application October 13, 1958
Serial No. 766,670

5 Claims. (Cl. 260—290)

This invention is concerned with an organosilicon derivative of pyridine, and more particularly relates to the compound β-(2-pyridyl)ethyltrichlorosilane and methods for preparing the same.

The above-identified compound which for brevity will hereinafter be referred to as "pyridylchlorosilane" is generally prepared by effecting reaction between vinylpyridine and trichlorosilane at elevated temperatures. The vinylpyridine which has the formula

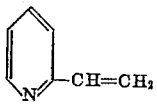

can be mixed with the trichlorosilane ($HSiCl_3$) and can react at temperatures of from about 0° C. to 200° C. for times ranging from about 1 to 12 hours (depending on the temperature used) to obtain a good yield of the pyridylchlorosilane. The fact that such reaction can proceed without the use of any catalyst, for instance, an alkaline catalyst such as more particularly recited in the copending application of Maurice Prober, Serial No. 401,702, filed December 31, 1953, and assigned to the same assignee as the present invention, was entirely unexpected and in no way could have been predicted, since it had been believed heretofore that in reactions of olefinic compounds with SiH derivatives, a catalyst is usually required and in some instances an alkaline catalyst such as tributylamine, etc., is a necessity. It will of course be understood by those skilled in the art that the use of an alkaline catalyst is not precluded and it has been found that improved yields at faster rates of conversion are attained by the use of the aforementioned catalysts recited in the above-described Prober application.

Although the molar concentrations of the vinylpyridine and the trichlorosilane may be varied within wide limits, I prefer to employ from about 1 to 3 mols of the vinylpyridine per mol of the trichlorosilane.

In order that those skilled in the art may better understand how the present invention may be practiced, the following examples are given by way of illustration and not by way of limitation.

*Example 1*

Into a three-necked flask equipped with stirrer, thermometer, reflux condenser, and dropping funnel was placed 105 ml. (1 mole) of 2-vinylpyridine. Trichlorosilane was added slowly with mixing to the 2-vinylpyridine while the temperature was raised slowly from about 110° C. to about 150° C. In all, about 53 ml. (0.53 mole) trichlorosilane was added during a period of about one hour. The reaction mixture thus obtained was combined with about 200 ml. dry benzene and the mixture heated to obtain a uniform slurry of the reaction product in the benzene. This latter mixture was cooled, filtered and dried to give about 101.3 grams (0.41 mole) of somewhat crude, solid β-(2-pyridyl) ethyltrichlorosilane having a melting point of from 185–200° C. This material was recrystallized from hot tetrachloroethane to give essentially pure pyridylchlorosilane melting at about 205–210° C. and boiling with slight decomposition at 280° C.

*Example 2*

A mixture of 21 ml. (0.2 mole) vinylpyridine, 20 ml. (0.2 mole) trichlorosilane, 5 ml. (0.02 mole) tri-n-butylamine, and 50 ml. of dry chloroform was refluxed (around 55° C.) for about 9 hours, the mixture cooled and filtered to give 28.1 grams (about 0.117 mole) of β-(2-pyridyl)-ethyltrichlorosilane.

*Example 3*

In this example, about 0.1 mole 2-vinylpyridine and 0.1 mole trichlorosilane were mixed at about 0° C. and thereafter 3 ml. triethylamine was added. The solution was left for about 16 hours at 0° C. to give a solid material. The mixture was then warmed to about 100° C. in vacuum (about 1 mm.) to volatilize the unreacted vinylpyridine, trichlorosilane, triethylamine, and amine hydrochlorides to give about 21.8 grams (0.091 mole) β-(2-pyridyl)-ethyltrichlorosilane.

The pyridylchlorosilane is readily recrystallized from hot tetrachloroethane in the form of colorless rods or blades which melt at 205–210° C. This material is only slightly soluble in boiling chlorobenzene but fairly soluble in hot chloroform or ethylene dichloride. It dissolves in water and alcohols with vigorous evolution of heat. Analysis of the pyridylchlorosilane showed it contained 11.6% silicon and had a neutral equivalent of 80.4, as contrasted to the theoretical value of 11.6% silicon and a neutral equivalent of 80.2.

The pyridylchlorosilane described above is unusual in melting at the high temperature it does, since most chlorosilanes are liquids or low melting solids. It is additionally unusual in that it is difficulty soluble in nonpolar solvents such as benzene and chlorobenzene even at their boiling points, but dissolves readily in more polar solvents such as chloroform, ethylene dichloride and tetrachloroethane. The pyridylchlorosilane may possibly exist in equalibrium with a cyclized ionic form as illustrated below:

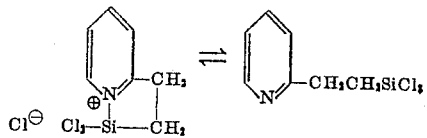

The pyridylchlorosilane above dissolves completely in water to give a clear, stable solution with what is believed to be a low polymer of β-(2-pyridyl)ethyl siliconic acid hydrochloride. Evaporation of such solutions gives a hard resinous material which is readily soluble in water, even after heating overnight at 105° C. The cycle of dissolution in water, evaporation and heating at 105° C. may be continued repeatedly without any formation of gel. Even the neutral amino acid, which may be precipitated as a sticky resin, by neutralizing its solution in either acid or alkali, appears to be reluctant to form gels. It is still completely soluble in alcohol or benzene after heating at 105° C.

The β-(2-pyridyl)ethyltrichlorosilane contains tertiary amine and trichlorosilyl groups in the same molecule and thus represents a new type of carbon-functional silicon compound. Since the carbon-silicon bond in the pyridylchlorosilane is unexpectedly stable to hydrolysis even in the presence of hot alkali (in contrast to the much weaker resistance to the effects of alkali in the case where the pyridyl group is attached directly to silicon), the pyridylchlorosilane can be used for co-hydrolysis with other organochlorosilanes, for instance, dimethyldichlorosilane, phenyltrichlorosilane, methyltrichlorosilane, diphenyldichlorosilane, vinylmethyldichlorosilane, etc., to form organopolysiloxane resins, oils, and rubbers useful as high temperature lubricants, as high temperature coating compositions, for instance, as insulation for electrical conductors, as gasket materials where high temperature resistance is desired, etc. The presence of the pyridylethyl side chain improves the polarity and toughness of organopolysiloxanes containing such groupings, and imparts to such organopolysiloxanes containing the pyridylethyl side chain, a function as an anion exchange resin.

What I claim as new and desire to secure by Letters Patent of the United States is:

1. The chemical compound β-(2-pyridyl)ethyltrichlorosilane.
2. The process of making β-(2-pyridyl)ethyltrichlorosilane which comprises effecting reaction between 2-vinylpyridine and trichlorosilane.
3. The process as in claim 2 in which the reaction is carried out in the presence of a tertiary amine.
4. The process as in claim 2 in which the reaction is carried out in the presence of tri-n-butylamine.
5. The process as in claim 2 in which the reaction is carried out in the presence of triethylamine.

References Cited in the file of this patent

UNITED STATES PATENTS

| | | |
|---|---|---|
| 2,584,665 | Bluestein | Feb. 5, 1952 |
| 2,854,455 | Cislak | Sept. 30, 1958 |